July 14, 1925.
D. BUMGARDNER
ATTACHMENT FOR DENTAL PLATES
Filed July 19, 1924
1,546,006
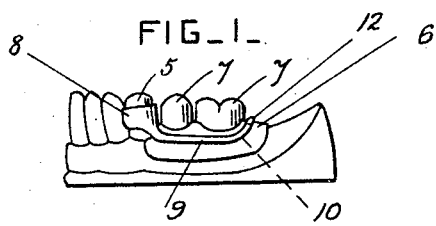
FIG_1_
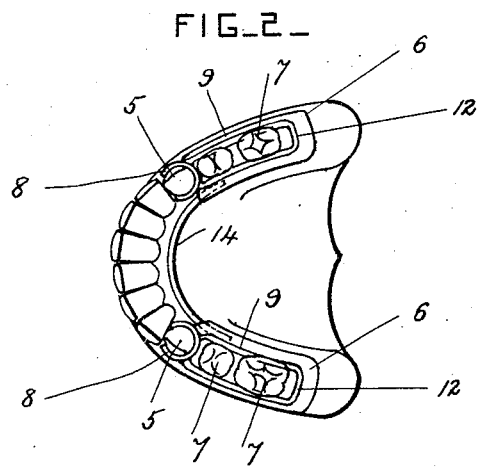
FIG_2_
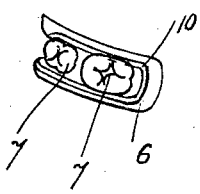
FIG_3_
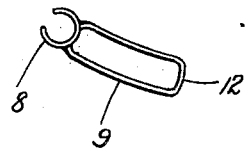
FIG_4_
Inventor
Dayton Bumgardner,
by Herbert W. F. Jenner,
Attorney Patented July 14, 1925.

1,546,006

UNITED STATES PATENT OFFICE.

DAYTON BUMGARDNER, OF CHICAGO, ILLINOIS.

ATTACHMENT FOR DENTAL PLATES.

Application filed July 19, 1924. Serial No. 727,021.

*To all whom it may concern:*

Be it known that I, DAYTON BUMGARDNER, a citizen of the United States, residing at Chicago, in the county of Cook and State of Illinois, have invented certain new and useful Improvements in Attachments for Dental Plates, of which the following is a specification.

This invention relates to attachments for holding dental plates having one or more artificial teeth in place in the human mouth, in what is known as buccal restoration; and it consists of a frame provided with a clasp for holding it attached to an anchorage in the mouth and operating to retain the dental plate in position, as hereinafter fully described and claimed.

In the drawings, Figure 1 is a side view of a portion of a human jaw showing a dental plate held in position by a frame and clasp according to this invention. Fig. 2 is a plan view of the jaw showing two similar plates as shown in Fig. 1 with their saddles coupled together. Fig. 3 is a plan view of one plate with the frame removed. Fig. 4 is a plan view of the frame and clasp.

This attachment can be applied to upper or lower dentures, and on one or both sides of the mouth. It is used when the posterior teeth have been lost, leaving only the anterior six, and one or two bicuspid teeth. By its use the desired number of teeth can be restored, and the strain of masticating with the artificial teeth can be transmitted to the alveolar ridge, relieving the tooth or teeth which is used as an anchorage from all undesirable strain. The jaw shown in the drawings has an anchorage 5 which projects from the alveolar ridge, and this anchorage may be a natural tooth, or the same built up or crowned.

A saddle plate 6 is provided which fits over the alveolar ridge where the posterior teeth are lacking, and which has one or more artificial teeth 7.

The plate 6 is generally formed of vulcanized india rubber, but it may be formed of gold or any other approved material. A clasp 8 is fitted to the tooth or anchorage 5, and a loop-shaped frame 9 is rigidly secured to this clasp. This frame encircles the tooth or teeth 7, and bears on the saddle plate 6, which is preferably provided with a shallow groove 10 which forms a seat for the frame. The end portion 12 of the loop forms an arch which extends over the rear end portion of the plate, and its side portions extend along the side portions of the plate clear of the teeth. The clasp and frame are preferably formed of platinized gold wire, commonly known as clasp metal wire, but may be made of any other approved material. The frame 9 and its end part 12 are non-resilient, and as they rest loosely on the saddle, and are not sprung into engagement with any part of it, the saddle is free to move a little under the frame and does not tend to loosen the abutment in the act of masticating food.

When both sides of the mouth are provided with similar dental plates, formed right and left, the two saddles are preferably connected together by one or more crossbars 14 secured to them at any desired points. These crossbars are formed of similar material to the frames, and are preferably rigidly secured to the saddles.

The frame fits loosely over the artificial teeth and does not touch their sides, but when the tops of the teeth are broader than the frame, as shown, the frame and plate remain connected when removed from the mouth.

What I claim is:

1. An attachment for a dental saddle plate, comprising a removable clasp adapted to engage with a stationary abutment, and a non-resilient frame which projects from the clasp and is adapted to rest loosely on the side surfaces of the dental plate.

2. An attachment for a dental saddle plate, comprising a removable clasp adapted to engage with a stationary abutment, and a non-resilient loop-shaped frame which projects from the clasp and is adapted to rest loosely on the side surfaces and end portion of the dental plate.

3. The combination, with a dental plate provided with grooves in its side surfaces, of an attachment comprising a removable clasp adapted to engage with a stationary abutment, and a non-resilient frame which projects from the clasp and rests loosely in the said grooves.

4. The combination, with dental saddle plates formed right and left and connected together by a crossbar, of attachments formed right and left, each attachment comprising a removable clasp adapted to engage with an anchorage, and a non-resilient frame which projects from the clasp and rests loosely on the side surfaces of the saddle plate to which it pertains.

In testimony whereof I have affixed my signature.

DAYTON BUMGARDNER.